(12) United States Patent  
Kosman

(10) Patent No.: US 6,280,137 B1
(45) Date of Patent: Aug. 28, 2001

(54) APPARATUS FOR TRANSPORTING ROWS OF PRODUCTS

(75) Inventor: Wilhelmus Jacobus Maria Kosman, Groesbeek (NL)

(73) Assignee: Beheermaatschappij de Boer Nijmegen B.V. (NL)

( * ) Notice: Subject to any disclaimer, the term of this patent is extended or adjusted under 35 U.S.C. 154(b) by 0 days.

(21) Appl. No.: 09/232,102

(22) Filed: Jan. 15, 1999

(30) Foreign Application Priority Data

Jan. 16, 1998 (NL) .................................................... 1008042

(51) Int. Cl.⁷ .................................................... B65H 31/30
(52) U.S. Cl. .................... 414/790; 414/790.5; 414/795.4
(58) Field of Search .............................. 414/795.4, 790, 414/790.5, 790.6, 790.8, 796, 797.6

(56) References Cited

U.S. PATENT DOCUMENTS 3,528,576 * 9/1970 Runyan et al. .................... 414/797.6
3,599,805 * 8/1971 Spencer ................................ 414/790
4,121,723 * 10/1978 Nellen et al. ......................... 414/790
4,953,687 * 9/1990 Gazzarrini ............................ 414/790
5,707,204 * 1/1998 Haase .................................. 414/790

FOREIGN PATENT DOCUMENTS 2170045 9/1973 (FR) .
7902931 7/1980 (NL) .

* cited by examiner

*Primary Examiner*—Joseph A. Fischetti
(74) *Attorney, Agent, or Firm*—Webb Ziesenheim Logsdon Orkin & Hanson, P.C.

(57) ABSTRACT

An apparatus for transporting rows of products that includes a supply device for supplying rows of products; a first transport device for transporting the rows of products through a certain distance in a first transporting direction, wherein each row of products is supported by a carrier; a sliding device for displacing the rows of products relative to the carrier; and a second transport device for transporting the displaced rows of products in a second transporting direction. The distance between adjacent carriers in the first transporting direction is smaller during the transport than the dimensions of the products. The sliding device is adapted to displace the rows of products parallel to the first transporting direction such that a row of displaced products rests on two adjacent carriers. The second transport device is adapted to lift the displaced rows of products from the carriers.

20 Claims, 4 Drawing Sheets

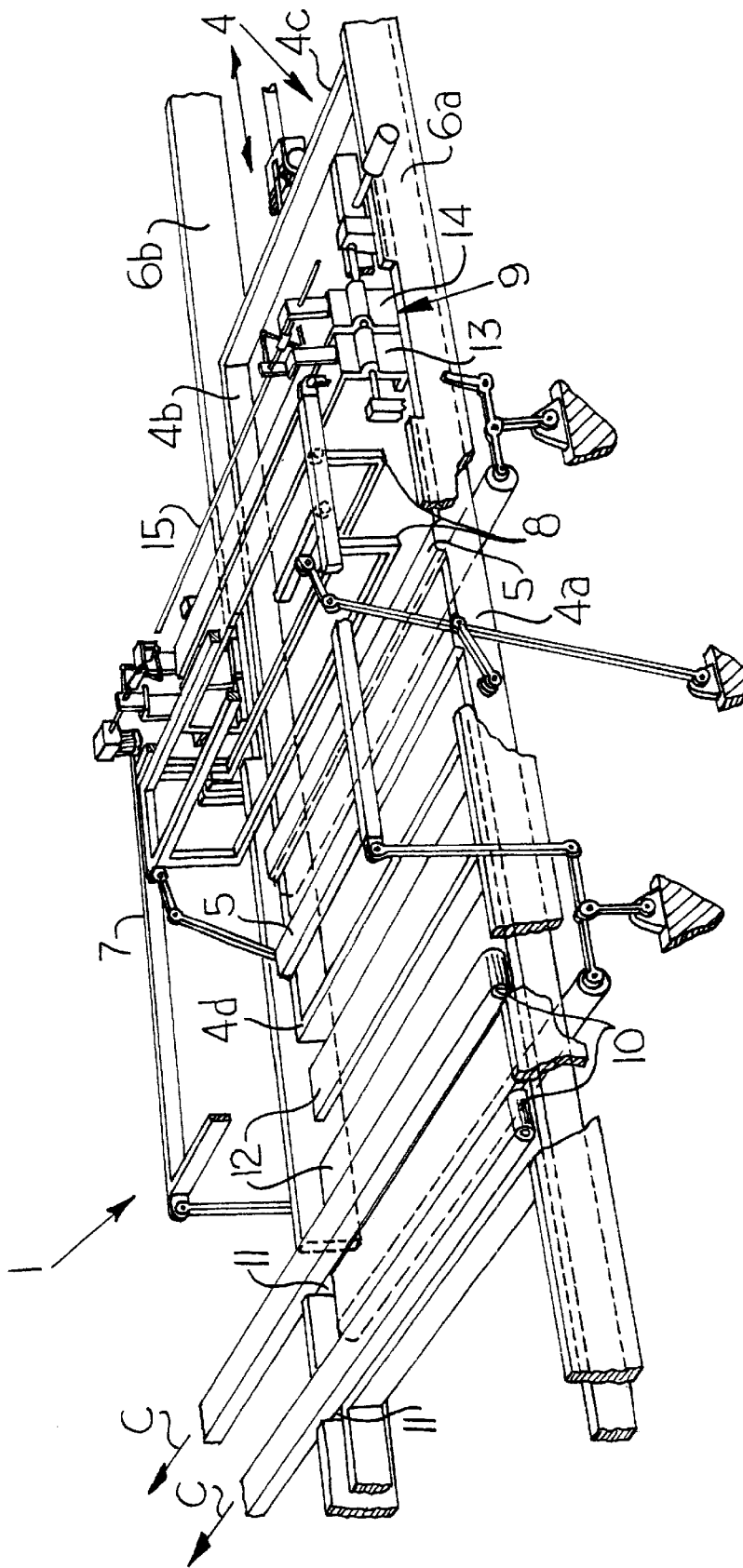

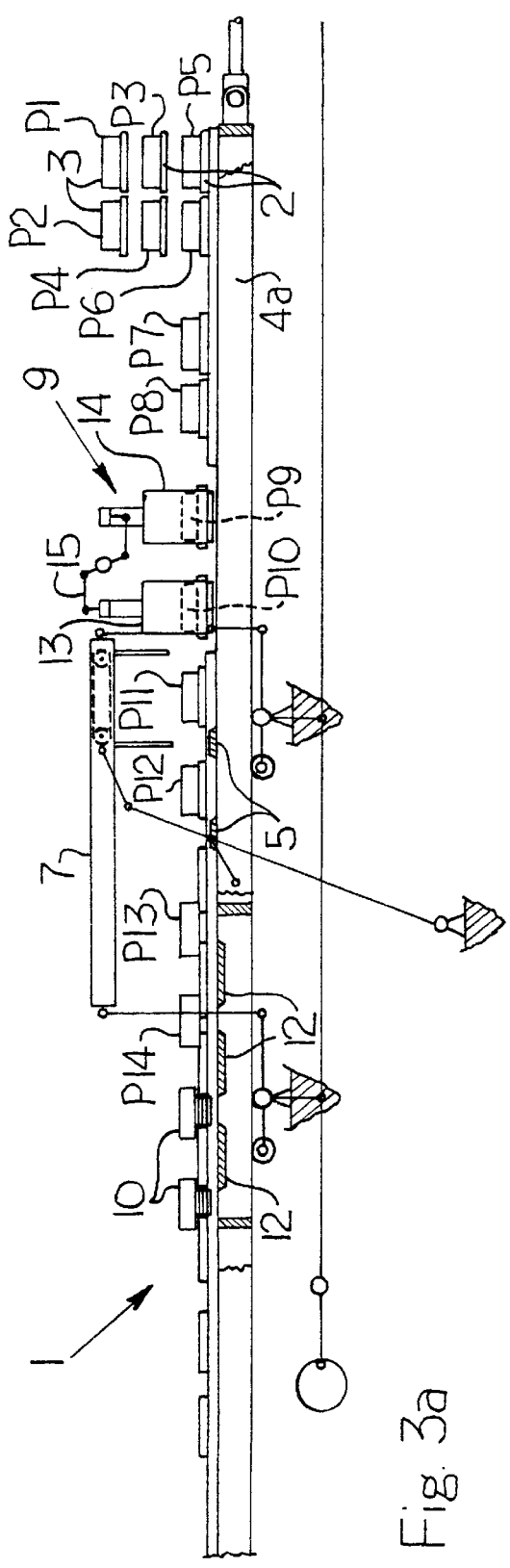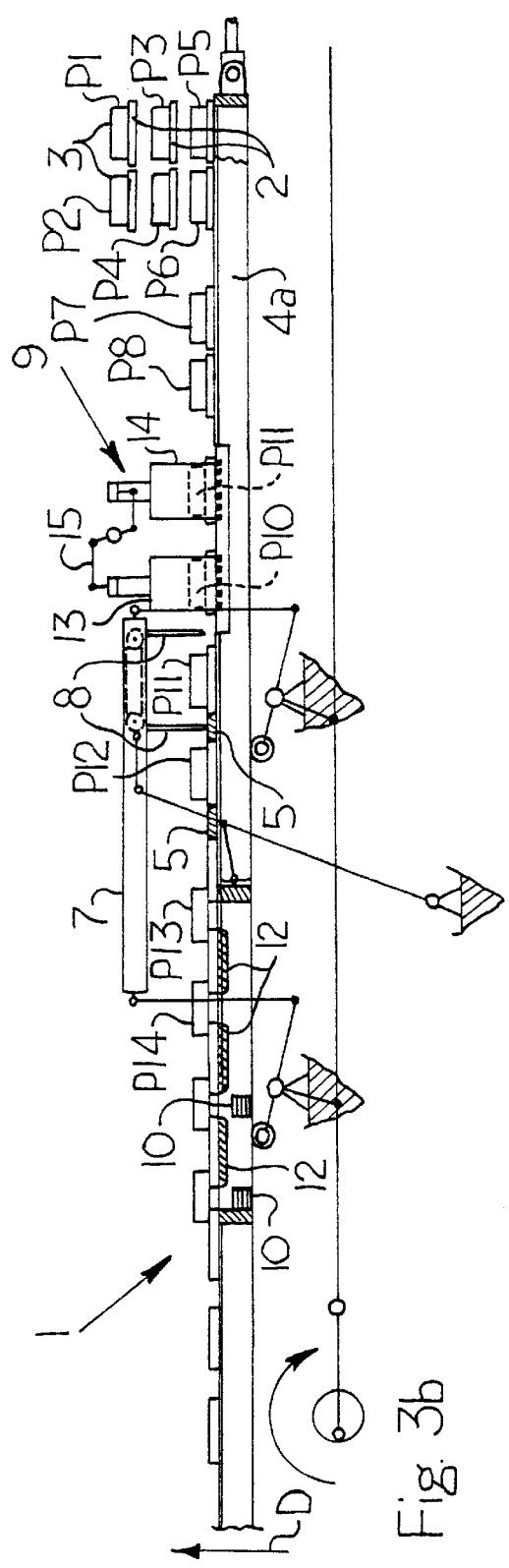

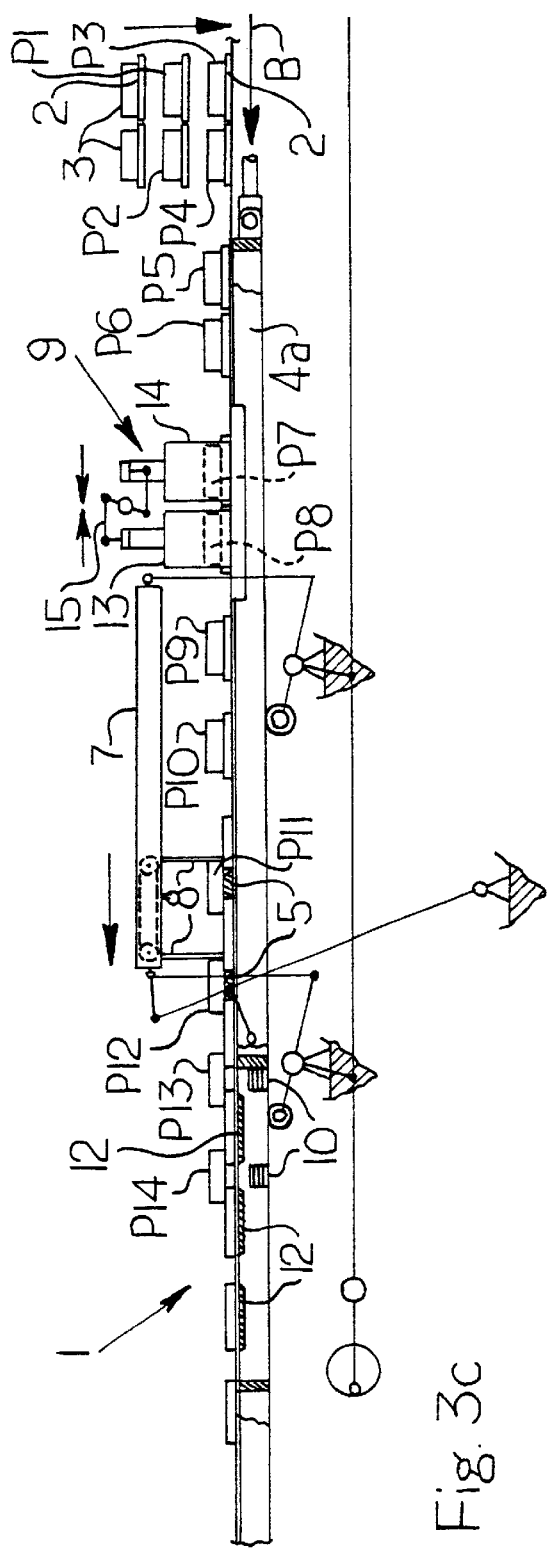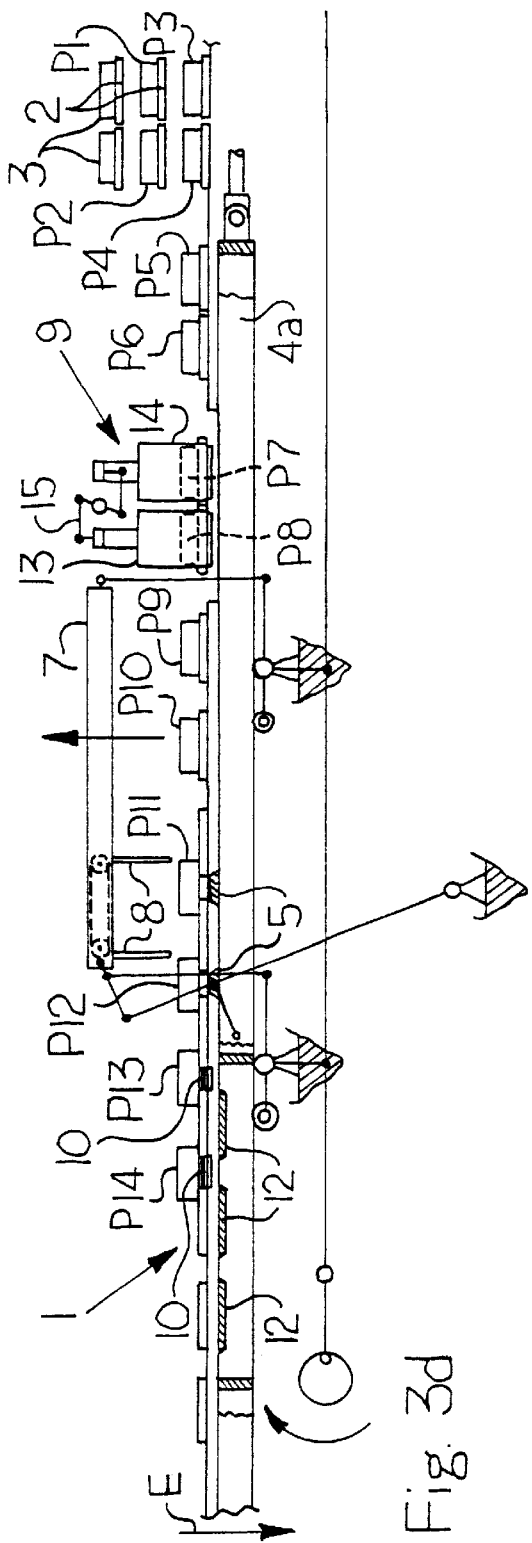

APPARATUS FOR TRANSPORTING ROWS OF PRODUCTS

BACKGROUND OF THE INVENTION

1. Field of the Invention

The invention relates to an apparatus for transporting rows of products, for instance green bricks or dried bricks for the brick manufacturing industry.

2. Description of the Prior Art

Such an apparatus is known and is marketed by applicant himself. The known apparatus is specially developed for the brick manufacturing industry and is utilized for transport of dried bricks to a kiln for further firing thereof. A lift provides for a supply of drying plates which function as carriers for the rows of bricks the drying plates are moved in a first transporting direction using first transport means. Sliding means are provided for sliding the rows of bricks off the drying plates in a second transporting direction transversely of the first transporting direction for further transport of the bricks using second transport means.

It has been found in practice that sliding the rows of bricks off the drying plates causes considerable noise nuisance and raises a great deal of dust. Shifting of the bricks in lengthwise direction over the drying plates moreover speeds up wear of the drying plates considerably.

The invention has for its object to provide an apparatus for transporting rows of products which obviates said drawbacks.

SUMMARY OF THE INVENTION

For this purpose the apparatus according to the invention has the feature that the distance between adjacent carriers during at least a part of the transport is smaller than the dimensions of the products as seen in the first transporting direction; and further:

that the sliding means are adapted to displace the rows of products substantially parallel to the first transporting direction such that a row of displaced products rests on two adjacent carriers; and that the second transport means are adapted to lift the displaced rows of products from the carriers.

The apparatus according to the invention is generally very suitable for transport of all kinds of products in two different transporting directions, wherein sliding of products over the carriers must be avoided as far as possible.

In a first preferred embodiment the second transport means are disposed movably between the carriers. The second transport means preferably include at least one endless conveyor belt which, with the end thereof co-acting with the first transport means, is deployed for substantially vertical movement between the carriers. With this preferred embodiment factory space is utilized as efficiently as possible.

In a further preferred embodiment the sliding means and/or the second transport means are coupled to the first transport means by means of a positive mechanical coupling. This provides the option of controlling the whole apparatus using one control unit, for instance a PLC control unit.

Spreading means are preferably provided for placing adjacent carriers with products at a predetermined mutual distance, this distance being smaller than the dimensions of the products as seen in the first transporting direction. The spreading means are preferably also coupled to the first transport means by means of a positive mechanical coupling.

Further advantageous embodiments are described with reference to the drawings.

BRIEF DESCRIPTION OF THE DRAWINGS

FIG. 2 shows the apparatus according to the invention in the same view as in FIG. 1 but omitting the drying plates with and;

FIGS. 3A–3D show different positions of the apparatus according to the invention as elucidation of the operation thereof.

DETAILED DESCRIPTION OF THE PREFERRED EMBODIMENTS

Figure 1:
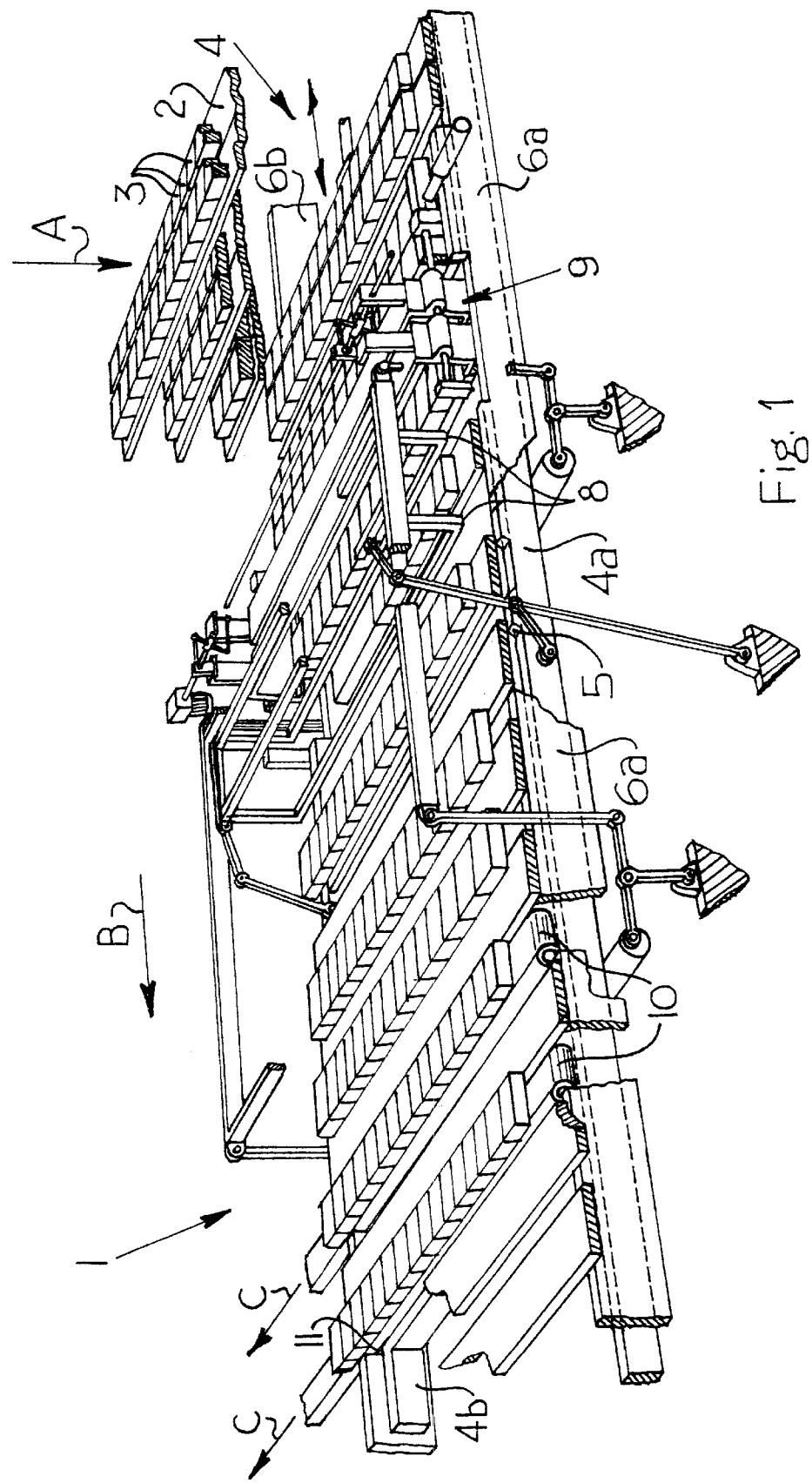
FIG. 1 shows schematically a perspective view of the apparatus according to the invention.

FIG. 1 shows schematically an apparatus 1 according to the invention.

FIG. 2 shows the same apparatus without the products for transporting, whereby the components of apparatus 1 are shown more clearly.

Using per se known supply means, for instance a lift (not shown), pairs of drying plates 2 are provided with rows of dried bricks 3 supplied in the direction of arrow A to apparatus 1. First transport means, in this embodiment in the form of a so-called walking beam system, the operation of which is elucidated hereinafter with reference to FIGS. 3A–3D, transport drying plates 2 with bricks 3 thereon in the direction of arrow B, i.e. the first transporting direction. The first transport means include longitudinal beams 4A and 4B which in combination with a number of cross beams 4C and 4D form a support frame 4 for drying plates 2, which support frame is displaceable in the first transporting direction inside a fixed frame 6. Provided for the movement of the support frame is a lifting mechanism 7 to which are coupled sliding means 8.

Second transport means in the form of endless conveyor belts 10 provide further transport of bricks 3 in the second transporting direction as designated with arrow C. One of the longitudinal beams GB of the fixed frame is provided with openings 11 for passage of outfeed belts 10. In addition, some further cross beams 12 are provided which are fixed to longitudinal beam 4A, but not to longitudinal beam 4B, of the fixed frame. These further cross beams 12 are also designated as spoons.

The operation of the apparatus according to the invention will now be elucidated with reference to FIGS. 3A–3D, in which the apparatus shown in FIGS. 1 and 2 is depicted schematically in side view.

Apparatus 1 performs a cyclic movement, wherein one cycle can be roughly sub-divided into four steps which are shown in the figures as follows:

step 1 is the transition from the position shown in FIG. 3A to that of 3B;

step 2 is the transition from the position shown in FIG. 3B to that of 3C;

step 3 is the transition from the position shown in FIG. 3C to that of 3D;

step 4 is the transition from the position shown in FIG. 3D to that of 3A.

In order to clearly distinguish the positions of the different rows of bricks during the different steps, these are designated by means of reference numerals P1–P14.

FIG. 3A shows the starting position of apparatus 1. In this embodiment drying plates 2 with rows of bricks 3 thereon have just been supplied at positions P5 and P6. During step 1 the support frame 4, of which only longitudinal beam 4A is visible in these figures, is moved upward (arrow D) using lifting mechanism 7, so that the support frame is carried into engagement with the drying plates with bricks at positions P5–P14. This is shown in FIG. 3B.

During step 2 the support frame 4A, and therewith the rows of bricks at positions P5–P14, are transported through a predetermined distance in transporting direction B. The new position of apparatus 1 after this transport is shown in FIG. 3C. During step 2 the rows of bricks at positions P11 and P12 are shifted relative to the associated drying plates such that the relevant rows of bricks come to rest on two adjacent drying plates. This displacement takes place using beams 5 of frame 4 in combination with sliding means 8 which comprise sliding elements of generally rectangular shape, the length of which corresponds with the length of the rows of bricks for shifting. Sliding means 8 are linked by means of a positive mechanical coupling to the movement of the support frame. The position of apparatus 1 after shifting and transport is shown in FIG. 3C.

During step 3 the support frame moves downward, wherein outfeed belts 10 move simultaneously upward (arrow E) between spoons 12 and openings 11 to thus raise the rows of bricks at positions P13 and P14 from the respective drying plates for transport in the second transporting direction. The support frame and the drying plates with rows of bricks at positions P5–P14 are now no longer in mutual contact. The rows of bricks at positions P5–P12 now rest on fixed frame 6 and the contact between sliding means 8 and the rows of bricks at positions P11 and P12 is now broken. This new position is shown in FIG. 3D.

During step 4 apparatus 1 moves back to the starting position as shown in FIG. 3A. During this step spreading means 9 ensure that the drying plates with rows of bricks at positions P7 and P8 are placed at a certain mutual distance which is smaller than the dimensions of the bricks in question as seen in transporting direction, so that these bricks can later be placed between two adjacent drying plates using sliding means 8, wherein they are supported by both drying plates, spreading of the drying plates with bricks preferably takes place during the fourth step. Spreading means 9 are preferably coupled for this purpose to the support frame by means of a positive mechanical coupling. In this embodiment spreading means 9 comprise two generally rectangular engaging members 13 and 14 which can be pushed over the rows of bricks with drying plates The distance between members 13 and 14 can be adjusted by means of coupling rod 15. As an to the spreading means, the drying plates with bricks can also be supplied at the desired mutual distance.

In the described preferred embodiment the drying plates serve as carriers for the bricks.

The invention is of course not limited to the shown and described preferred embodiment but includes all embodiments which are consistent with the foregoing description and which fall within the scope of the appended claims.

What is claimed is:

1. An apparatus for transporting rows of products, the apparatus comprising:
a plurality of separate carriers movable in a first transporting direction and configured to hold the rows of products;
supply means for supplying a row of products to one of said separate carriers;
first transport means for transporting the carriers with rows of products thereon through a certain distance in the first transporting direction;
sliding means for displacing each row of products relative to its associated carrier and along the first transporting direction such that a row of displaced products now rests on two adjacent and spaced carriers, with the adjacent carriers separated by a distance not greater than the dimension of the products along the first transport direction; and
second transport means for transporting the displaced rows of products in a second transporting direction and lifting the displaced rows of products from the adjacent spaced carriers.

2. The apparatus as claimed in claim 1, wherein the second transport means are disposed movably between the carriers.

3. The apparatus as claimed in claim 1, wherein the second transport means comprise at least one endless conveyor belt which, with the end thereof co-acting with the first transport means, is deployed for substantially vertical movement between the carriers.

4. The apparatus as claimed in claim 1, wherein the sliding means comprise sliding elements that traverse at least a part of the carriers in a direction substantially perpendicular to the first transporting direction.

5. The apparatus as claimed in claim 1, wherein at least one of the sliding means and the second transport means are coupled to the first transport means by means of a positive mechanical coupling.

6. The apparatus as claimed in claim 1, wherein the first transport means are configured to perform a cyclic movement consisting of four steps, wherein the first step comprises engaging of the first transport means on the rows of products, the second step comprises the transport of the rows of products through a certain distance in the first transporting direction, the third step comprises disengaging of the first transport means from the rows of products and the fourth step comprises a return to the starting position of the first step.

7. The apparatus as claimed in claim 6, wherein the first transport means comprise two longitudinal beams between which a number of cross beams are fixed, wherein at the position of the second transport means openings are provided in at least one of the longitudinal beams for passage of the second transport means.

8. The apparatus as claimed in claim 6 wherein the sliding means are configured to displace the rows of products during the second step.

9. The apparatus as claimed in claim 6, wherein the second transport means are configured to move upward during the third step in order to lift the products.

10. The apparatus as claimed in claim 1, further including spreading means that separate adjacent carriers with products by a predetermined mutual distance that is not greater than the dimensions of the products along the first transporting direction.

11. The apparatus as claimed in claim 10, wherein the spreading means are coupled to the first transport means by means of a positive mechanical coupling.

12. The apparatus as claimed in claim 10, wherein the spreading means are configured to spread the carriers with rows of products during the fourth step.

13. The apparatus as claimed in claim 2, wherein the second transport means comprise at least one endless conveyor belt which, with the end thereof co-acting with the first transport means, is deployed for substantially vertical movement between the carriers.

14. The apparatus as claimed in claim 2, wherein the sliding means comprise sliding elements that traverse at least a part of the carriers in a direction substantially perpendicular to the first direction.

15. The apparatus as claimed in claim 2, wherein at least one of the sliding means and the second transport means are coupled to the first transport means by means of a positive mechanical coupling.

16. The apparatus as claimed in claim 2, wherein the first transport means are configured to perform a cyclic movement consisting of four steps, wherein the first step comprises engaging of the first transport means on the rows of products, the second step comprises the transport of the rows of products through a certain distance in the first transporting direction, the third step comprises disengaging of the first transport means from the rows of products and the fourth step comprises a return to the starting position of the first step.

17. The apparatus as claimed in claim 7, wherein the sliding means are configured to displace the rows of products during the second step.

18. The apparatus as claimed in claim 7, wherein the second transport means are configured to move upward during the third step in order to lift the products.

19. The apparatus as claimed in claim 8, wherein the second transport means are configured to move upward during the third step in order to lift the products.

20. The apparatus as claimed in claim 11, wherein the spreading means are configured to spread the carriers with rows of products during the fourth step.

* * * * *

UNITED STATES PATENT AND TRADEMARK OFFICE
CERTIFICATE OF CORRECTION

PATENT NO. : 6,280,137 B1
DATED : August 28, 2001
INVENTOR(S) : Wilhelmus Jacobus Maria Kosman It is certified that error appears in the above-identified patent and that said Letters Patent is hereby corrected as shown below:

Column 1,
Line 14, after "for a supply" should read -- for a pair-wise supply --.
Line 15, "rows of bricks the" should read -- rows of bricks. The --.

Column 2,
Line 10, "with and;" should read -- with bricks; and --
Line 41, "beams GB" should read -- beams 6B --.

Column 3,
Line 48, "As an to" should read -- As an alternative to --.

Signed and Sealed this

Thirtieth Day of April, 2002

*Attest:*

JAMES E. ROGAN
*Attesting Officer*     *Director of the United States Patent and Trademark Office*